F. PORHARTY.
VALVE FOR ROTATING DRUMS.
APPLICATION FILED JULY 21, 1920.
1,393,825. Patented Oct. 18, 1921.
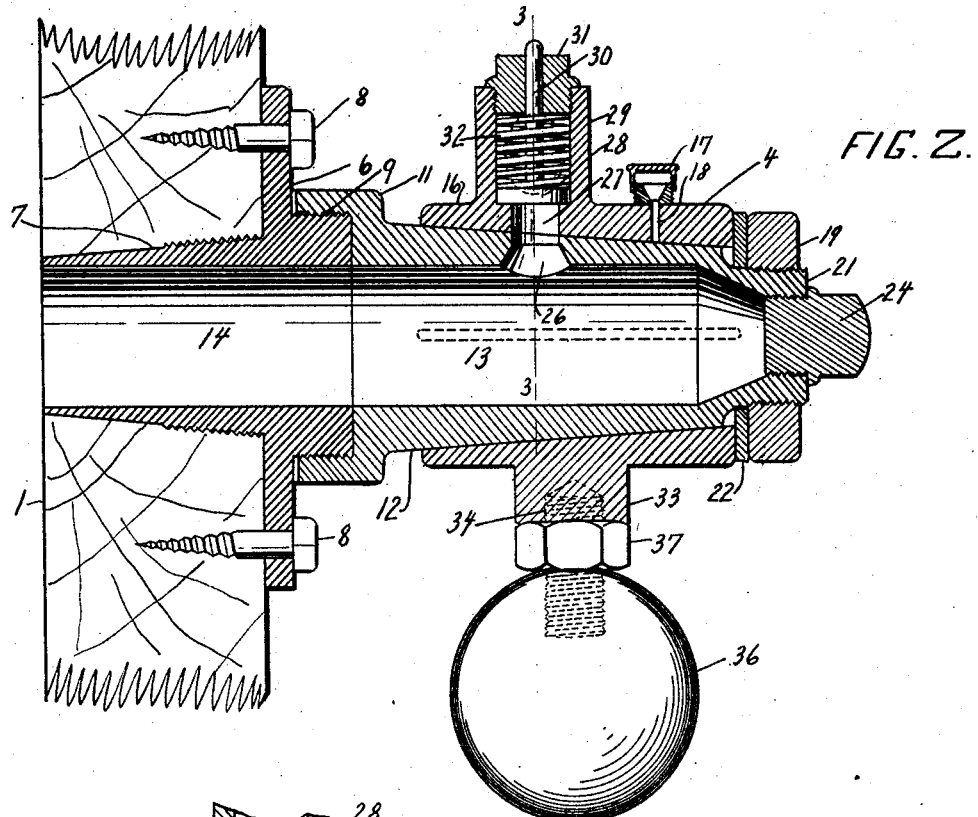
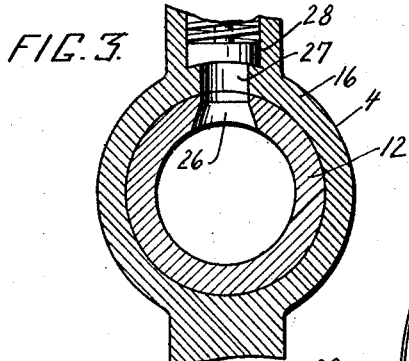
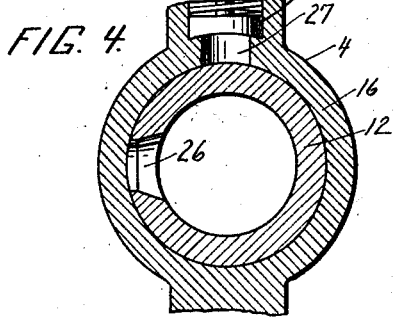
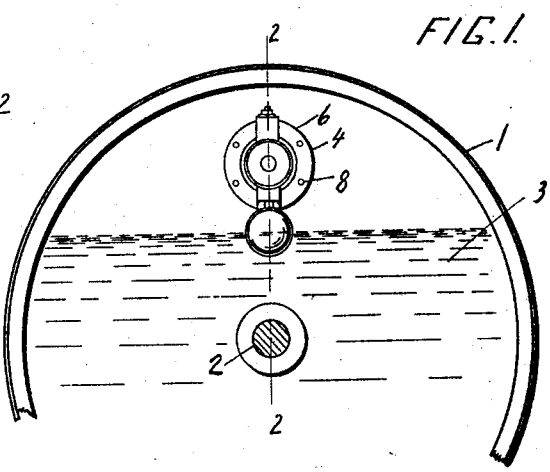
INVENTOR
F. PORHARTY
BY A. Schaff
ATTY.

UNITED STATES PATENT OFFICE.

FREDRICK PORHARTY, OF SAN FRANCISCO, CALIFORNIA.

VALVE FOR ROTATING DRUMS.

1,393,825.   Specification of Letters Patent.   Patented Oct. 18, 1921.

Application filed July 21, 1920. Serial No. 397,992.

*To all whom it may concern:*

Be it known that I, FREDRICK PORHARTY, a citizen of no country, residing at 4619 17th street, in the city and county of San Francisco, State of California, have invented a new and useful Valve for Rotating Drums, of which the following is a specification.

My invention relates to improvements in valves for rotating drums or barrels in which high pressures are created by chemical reaction as, for instance, in drums used in the tanning industry. The object of the invention is to provide a valve which, when attached to a partly filled rotating drum, rotates with the drum and automatically opens when it approaches the highest point on its travel and automatically closes again after it has passed said highest point, and which only opens when the pressure in the drum exceeds a certain pre-determined limit.

I attain these objects by the mechanism illustrated in the accompanying drawing, in which Figure 1 is an outside elevation of a drum with my valve attached to it, Fig. 2 is a longitudinal cross-section through the valve along line 2—2 of Fig. 1, Fig. 3 is a sectional view of the valve along line 3—3 of Fig. 2, parts of the valve being shown broken away, and Fig. 4 shows the same view as Fig. 3 after the drum has made a quarter of a turn.

It will be seen that by reason of this arrangement during the revolving motion of the drum the ring 16 will maintain its position, in which the weight hangs perpendicularly under the ring, and that the hole 27 in the ring will register with the hole 26 in the valve casing only when the latter hole is in its uppermost position, that is, when the valve is in its uppermost position, when the pressure from within will allow the gases to escape, provided the pressure is strong enough to overcome the resistance of the spring 32.

1 is an air-tight drum or barrel rotatably connected to axis 2 and partly filled with a fluid or mixture 3. The valve 4 is attached to the drum by means of flanged sleeve 6, let into one end of the drum 1 as shown at 7 and firmly held in place by a number of wood screws 8, one externally threaded part 9 of the sleeve protruding outside the drum and adapted to receive the internally threaded flange 11 of the valve casing 12, the cylindrical opening 13 of the casing registering with the cylindrical aperture 14 of the sleeve 6. The outside of the casing 12 is conical shaped and adapted to receive the ring 16 which makes a tight, revolving fit around the casing and is prevented from sliding off by means of a nut 19 secured to a reduced extension 21 of the casing, washer 22 being interposed between the nut 19 and the ring 16. A grease cup 17 is provided on ring 16, adapted to force grease between the casing 12 and the ring 16 through the passage 18. The casing is closed by means of cap 24 screwed into extension 21. The casing 12 is provided, intermediate of its length, with a hole 26, partly cylindrical, partly conical in its shape, which registers with a cylindrical hole 27 in the ring 16 when the valve is in the position indicated in Figs. 1, 2 and 3. The hole 27 is covered by a disk 28, adapted to slide vertically in a perforated housing 29 and having an upwardly extending stem 30 which slides vertically in a cap 31 secured to the upper end of the housing 29. An expansion spring 32 between the cap 31 and the disk 28 forces the disk against the hole 27 in the ring 16 until the force of the spring is overcome by the pressure of the gases in the drum.

Underneath the ring 16, and intermediate of its length, a boss 33 is secured to the same adapted to receive the upper end of a threaded stud 34, the lower end of which is screwed into a weight 36, a nut 37 being interposed between the boss and the weight.

My device works as follows: While the drum 1 rotates, the casing 12 rotates with it and, it being rigidly fastened to the end of the drum, the hole 26 will change its position with reference to the axis of the casing 12, that is, when the drum has rotated through an angle of 90 degrees, the hole 26 will occupy the position indicated in Fig. 4; when the drum has rotated through an angle of 180 degrees, the hole 26 will be perpendicularly under the axis of the casing 12 and so on. The ring 16, while rotating with the drum, does not change its position with reference to the axis of the casing 12, owing to the fact that it is free to rotate on the casing 12 and is held in position by the weight 33, so that the hole 27 will always be perpendicular over the axis of the casing. Thus the holes 26 and 27 register only when the valve in the rotating drum reaches the highest point of its travel, and only at this point, or near it, may the valve be opened by the pressure of the gases inside the drum, provided the pressure is strong enough to overcome the resistance of the spring 32.

I claim:

1. A relief device for a rotating drum mounted on said drum eccentrically to the axis thereof and including a relief valve which is subject to drum pressure only when said device is in its highest position.

2. The combination of a rotary drum and a relief device therefor mounted on said drum eccentrically to the axle thereof, and adapted to relieve the pressure in said drum when it exceeds a predetermined amount, said attachment being operative only when in its highest position.

3. In combination with a rotating drum a valve, consisting of a substantially cylindrical casing and a ring about the same, the casing adapted to be rigidly secured to one end of the drum and to protrude outside the same, the outside part of the casing to have an outwardly tapering, conical surface, the ring to fit on the conical surface of the casing, adapted to rotate on the same and secured in its place by a nut screwed to a reduced extension of the casing, the ring provided with a weight adapted to prevent the ring from rotating with the casing and a spring-controlled hole; a corresponding hole in the wall of the casing adapted to register with the hole in the ring when the former occupies its highest position.

4. In combination with a rotating drum a valve, consisting of a substantially cylindrical casing and a ring about the same, the casing adapted to be rigidly secured to one end of the drum and to protrude outside the same, the ring to fit on the outside of the casing and adapted to rotate on the same, means for preventing the ring from sliding on the casing, the ring provided with a weight adapted to prevent it from rotating with the casing and having a spring-controlled hole; a corresponding hole in the casing adapted to register with the hole in the ring when the former occupies its highest position.

FREDRICK PORHARTY.